(12) United States Patent
Risch (10) Patent No.: US 10,451,498 B2
(45) Date of Patent: Oct. 22, 2019

(54) CABLE WITH OPTICAL-FIBER SENSOR FOR MEASURING STRAIN

(71) Applicant: PRYSMIAN S.p.A., Milan (IT)

(72) Inventor: Brian G. Risch, Claremont, NC (US)

(73) Assignee: PRYSMIAN S.p.A., Milan (IT)

(*) Notice: Subject to any disclaimer, the term of this patent is extended or adjusted under 35 U.S.C. 154(b) by 0 days.

(21) Appl. No.: 15/759,145

(22) PCT Filed: Sep. 10, 2015

(86) PCT No.: PCT/IB2015/001956
§ 371 (c)(1),
(2) Date: Mar. 9, 2018

(87) PCT Pub. No.: WO2017/042604
PCT Pub. Date: Mar. 16, 2017

(65) Prior Publication Data
US 2019/0056278 A1 Feb. 21, 2019

(51) Int. Cl.
 *G01L 1/24* (2006.01)
 *G02B 6/245* (2006.01)
 (Continued)

(52) U.S. Cl.
 CPC ............. *G01L 1/242* (2013.01); *G02B 6/245* (2013.01); *G02B 6/4416* (2013.01); *H01B 7/32* (2013.01); *H01B 9/005* (2013.01)

(58) Field of Classification Search
 CPC .......... G01L 1/242; G02B 6/245; H01B 9/005
 See application file for complete search history.

(56) References Cited

U.S. PATENT DOCUMENTS

| | | | |
|---|---|---|---|
| 6,374,023 B1* | 4/2002 | Parris | G02B 6/4492 385/100 |
| 6,653,148 B2* | 11/2003 | Trapp | G01N 21/643 422/82.07 |

(Continued)

FOREIGN PATENT DOCUMENTS

| EP | 0 527 266 A1 | 2/1993 |
|---|---|---|
| WO | WO 2007/107693 A1 | 9/2007 |
| WO | WO 2010/136062 A1 | 12/2010 |

OTHER PUBLICATIONS

International Search Report form the European Patent Office in corresponding International Application No. PCT/EP2015/001956 dated Dec. 15, 2016.

(Continued)

*Primary Examiner* — Ryan A Lepisto
(74) *Attorney, Agent, or Firm* — Finnegan, Henderson, Farabow, Garrett & Dunner, L.L.P.

(57) ABSTRACT

A cable includes a longitudinal structural element including at least one of an electrical conductor and an optical conductor, and a strain sensor arranged within a bending neutral region of the cable and mechanically coupled with the longitudinal structural element. The strain sensor includes an optical fiber coated with at least one coating layer, a release layer surrounding the coating layer, and a protective layer surrounding the release layer. The release layer includes a material selected from a silicone polymer, a fluoropolymer mixture or an extruded polymer containing a slip agent.

8 Claims, 5 Drawing Sheets

(51) Int. Cl.
G02B 6/44 (2006.01)
H01B 7/32 (2006.01)
H01B 9/00 (2006.01)

(56) References Cited

U.S. PATENT DOCUMENTS

| | | |
|---|---|---|
| 9,032,809 B2 | 5/2015 | Kemnitz et al. |
| 9,442,264 B1* | 9/2016 | Cheatle .................. G02B 6/443 |
| 2007/0031096 A1* | 2/2007 | Moorjani ............. G02B 6/4495 |
| | | 385/128 |
| 2011/0026889 A1 | 2/2011 | Risch et al. |
| 2012/0082422 A1* | 4/2012 | Sarchi .................... G01K 11/32 |
| | | 385/101 |
| 2015/0355040 A1* | 12/2015 | Sirbuly .................. G01L 1/242 |
| | | 356/73.1 |

OTHER PUBLICATIONS

Written Opinion of the International Searching Authority from the European Patent Office in corresponding International Application No. PCT/EP2015/001956, dated Dec. 15, 2016.

* cited by examiner

CABLE WITH OPTICAL-FIBER SENSOR FOR MEASURING STRAIN

TECHNICAL FIELD

The present disclosure relates generally to a cable with an integrated optical-fiber sensor for measuring strain, and more particularly, with a strain sensor having a release layer to facilitate stripping of protective layers while maintaining mechanical congruence with the cable conductors.

BACKGROUND

Cables, such as power (e.g., electric) cables and optical cables, can often experience mechanical stress and strain when they are elongated or bent under tensile forces and torques during operations. For example, electric cables, for example those for heavy-duty applications and/or for mobile installations, such as mobile harbor cranes, ship-to-shore container cranes, ship unloaders, spreaders, and mining and tunneling equipment, are specifically designed to withstand harsh environment conditions and high mechanical stresses, such as the pulling forces (e.g., tensile loads), bending forces, and torques. The resulting strain may be static or dynamic. The resulting strain may be tensile strain caused by the elongation of the cable and/or bending strain caused by the bending of the cable.

Tensile loads, bending/compressive loads, and twisting in a cable, such as a mobile cable, may result from forced guidance of the cable during the winding and unwinding phases around reels or from collection of the cable within baskets (e.g., for spreader cables). Winding and unwinding phases are typically discontinuous and often abrupt, for example when caused by a horizontal movement of a crane, thereby imposing significant dynamic tensile loads on the cable, and thus on the individual conductors within the electric cable. In addition, other systems for cable movement, such as pulley systems and tender systems, generally involve high tensile loads on the electric cable during operation. Fault or dysfunction of the powered apparatus may lead to the misplacement of the cable, which may, for example, drop from the guiding means thereof or be squeezed by apparatus portions thus causing an undue bending of the cable.

Excessive elongation of the electric or optical cables may cause the tensile loads to be transferred to the electrical or optical conductors, causing damage to the electrical or optical conductors. Excessive and/or prolonged tensile loads may result in a permanent elongation of the cable, which would shorten the life of the cable.

Similarly, excessive bending of the cable may cause the compressive loads to be transferred to the electrical or optical conductors, causing damage to the electrical or optical conductors.

Optical fiber strain sensors (hereinafter also referred to as strain sensors) have been used in power (or electric) and optical cables for monitoring strain (e.g., tensile and/or bending strain) occurring in the cables. The optical fiber included in a strain sensor is surrounded by one or more protective layers that provide mechanical protection and transfer to the optical fiber the strain experienced by the conductors of the cable to be monitored. The strain transfer is attained by suitable layers surrounding the optical fiber in a tight configuration.

Conventional tight-buffered optical fibers are designed for providing data communication, not for measuring strain. In conventional tight-buffered optical fibers, when strain increases, the outer buffer layer of a tight-buffered fiber may slip with respect to the coating system of the inner fiber because it is not bonded with the inner fiber tight enough. Thus, in a conventional tight-buffered configuration strain transferability from the cable core to the buffer layer and the optical fiber is unsuitable for cable strain monitoring.

In an optical-fiber strain sensor, a tighter configuration for the surrounding protective layers is typically used. In such a configuration, as disclosed for example in U.S. Pat. No. 9,032,809, the material of a buffer layer may be selected so as to adhere to the coating system of the optical fiber with essentially no or limited creeping, slipping or debonding. When the strain sensor is stripped to remove the buffer layer and expose the optical fiber, such a tighter configuration would typically require a greater strip force than conventional tight-buffered optical fibers.

PCT International Publication WO 2007/107693 (the '693 publication) discloses a fiber optic cable including a central optical fiber 105 that senses the cable stress, and at least one peripheral optical fiber that experiences only a portion of the cable stress imparted to the central optical fiber 105. With the structure disclosed in the '693 publication, a differential response to strain between a central optical fiber and a peripheral optical fiber can purportedly be obtained.

PCT International Publication WO 2010/136062 discloses a power cable provided with a strain sensor comprising an optical fiber coated by a primary coating, which is surrounded by a secondary coating. The primary coating and the secondary coating form a coating system. The optical fiber can be tight-buffered with a buffer layer surrounding the coating system. An adhesion-promoting layer can be provided between the optical fiber coating system and the tight buffer layer.

One problem encountered when using tightly buffered optical fibers is that of accessibility. It is desirable to be able to remove the protective buffer layer quickly, so that the enclosed optical fiber can be readily accessed, and various solutions have been proposed. For example, U.S. Patent Application Publication US 2011/0026889 (the '889 publication) discloses tight-buffered optical fiber units. The optical fiber unit includes an optical fiber that is surrounded by a polymeric buffering layer to define a fiber-buffer interface. The buffering layer includes an aliphatic amide slip agent (e.g., oleamide and erucamide) in an amount between about 0.01 percent and 0.5 percent sufficient for at least some of the aliphatic amide slip agent to migrate to the buffer-fiber interface to thereby promote stripping of the buffering layer. The buffer tube may be formed predominately of polyolefins, including fluorinated polyolefins. At least about 15 centimeters of the polymeric buffering layer can be removed from the optical fiber in a single operation using a strip force of less than about 10 N.

European Publication EP 0 527 266 (EP '266) discloses a tight buffered optical waveguide fiber having improved strippability and including an interfacial layer in contact with the first protective coating, and a buffer layer in contact with the interfacial layer. The interfacial layer comprises a solid lubricant such as sub-micron particles of polytetrafluoro-ethylene in a film-forming binder. This layer generally has a thickness of between about 4 and about 15 microns, and preferably about 5 microns. The solid lubricant comprises more than about 60% by weight of the layer and most preferably at least about 90%. The composition of the film-forming binder is chosen so that the binder will have an adequate level of adherence to the first protective coating so as to hold the solid lubricant in place on that coating.

EP '266 discloses that the interfacial layer is preferably more adherent to the first protective coating than to the buffer layer. In this way, the buffer layer can be readily stripped from the fiber, leaving behind the interfacial layer and the first protective coating.

The Applicant faced the problem of providing a strain sensor comprising an optical fiber suitable for monitoring the strain (tensile and/or bending strain) experienced by the conductors of an electric or optical cable in which it is located. In particular, Applicant confronted the dilemma of providing a cable strain sensor with a mechanical congruence with the cable conductors sufficient for monitoring cable strain while having characteristics enabling the optical fiber of the sensor to be released from the protecting layers without damaging the fiber and without much difficulty for the operator.

For connecting the optical fiber of the strain sensor to a measurement apparatus, a portion of the optical fiber should be exposed by stripping off the layers surrounding the optical fiber. But due to the high strip force required because of the tight configuration of the layers, the removal of the layers may be difficult and may cause damage to the optical fiber or alter the properties of the optical fiber. For example, the coating system of the optical fiber of the strain sensor may be damaged or the physical properties of which may be altered during the stripping process.

Applicant has therefore tackled the problem of releasing portions of an optical fiber in a mechanically coupled strain sensor during stripping without causing damage to the underlying fiber. To improve the strippability such that when the protective layers are removed no damage or change of properties will occur to the optical fiber included in the strain sensor, one method is to reduce the adhesion between the optical fiber and the protective layers using a slip agent or other lubricant materials. On the other hand, reducing the adhesion too much may lessen the mechanical congruence between the optical fiber (i.e., the strain sensing element) and the cable core (e.g., an electric conductor of an electric cable or an optical fiber of an optical cable) that is being monitored for the strain it experiences. As a result, the strain experienced by the cable core may not be sufficiently transferred to the strain sensor, and thus the strain measured by the strain sensor may not reflect the actual strain experienced by the cable core.

SUMMARY

The Applicant has found that strain sensors may be improved by providing a separate release layer between the optical fiber (comprising its coating system) and the surrounding protective layer(s), with suitable design of the release layer. The Applicant has found that a balance between the strain transferability and the strippability of the protective layers surrounding the optical fiber may be achieved by suitably selecting the thickness and chemical composition of the release layer disposed between the optical fiber and the tight buffer.

In one aspect, a cable comprises a longitudinal structural element including at least one of an electrical conductor and an optical conductor. The cable also includes a strain sensor arranged within a bending neutral region. The strain sensor mechanically couples the longitudinal structural element. The strain sensor includes an optical fiber coated with at least one coating layer, a release layer surrounding the coating layer, and a protective layer surrounding the release layer. The release layer includes a material selected from a silicone polymer, a fluoropolymer mixture or an extruded polymer containing a slip agent.

Advantageously, the release layer has a thickness less than or equal to 150 µm (i.e., 150 microns), such as less than or equal to 40 µm, for example, less than or equal to 10 µm. The release layer can have a thickness down to 0.05 µm.

Applicant has found that due to the small thickness of the release layer, the release layer does not lessen the mechanical congruence between the optical fiber of the strain sensor and the cable core, such as the conductor of an electric cable or of an optical cable.

In some embodiments, the release layer may be made of a fluoropolymer mixture, which may contain from 0.1 wt % to 5 wt % of fluoropolymer, preferably carried in a solvent, more preferably a fluorinated solvent. Alternatively, the release layer may be made of a silicone polymer, such as an uncrosslinked or a crosslinked silicone (in particular a room temperature vulcanization one, RTV), polydimethylsiloxane (PDMS) being preferred.

In a further alternative, the release layer may be made of an extruded polymer containing a slip agent. The slip agent is advantageously based on fatty acid amide, preferably in an amount of from 1 wt % to 10 wt %, a silicone or a fluoropolymer. The fatty acid amide can be selected from amides having a saturated or unsaturated $C_{10}$-$C_{22}$ chain, for example oleamide or erucamide. The silicone can be selected from a silicone polymer such as PDMS or functionalized PDMS. Preferably, the extruded polymer contains the silicone slip agent in an amount of from 0.2 wt % to 5 wt %. The fluoropolymer can be selected from fluropolymers such as polytetrafluoroethylene (PTFE) or other aliphatic fluorinated polymers or a fluoropolymer carried in a solvent, preferably a fluorinated solvent. Preferably, the polymeric layer contains the fluoropolymer slip agent in an amount of 0.4 wt % to 5 wt %. The extruded polymer can be selected from polyolefin (such as polyethylene or polypropylene), ethylene vinyl acetate (EVA) copolymer, polyester copolymer (such as thermoplastic polyester elastomer), optionally containing a flame-retardant filler such as magnesium or aluminum hydroxide, or polyvinylchloride (PVC). An extruded polymer containing a flame-retardant filler and PVC are preferred.

Due to its material, the release layer allows for removal by a user of the protecting layers (including, e.g., the sheltering sheath, the tight buffer, and the release layer) from the coated optical fiber in the strain sensor without damaging the coated optical fiber. The release layer may be suitable to enable a user to strip the protecting layers off the coated fiber with a stripping force of from about 1 N/10 cm to 9 N/10 cm, where N stands for the unit of force Newton.

Within the present description, the term "longitudinal structural element" included in a cable indicates a semi-finished structure substantially longitudinally extending along the cable length and performing a function which the cable is designed for. In an electric cable, a longitudinal structural element can be a conductor for power, electric energy or data transport and/or a ground conductor. In an electric cable, two or more longitudinal structural elements are typically stranded together. In an optical cable, a longitudinal structural element can be an optical conductor for data and/or signal communication, and may include a reinforcing element.

The term "electrical conductor" indicates a semi-finished structure of the electric cable comprising an electrical conductive element, such as a metal conductor, and an insulating layer surrounding the electrical conductive element. In some configurations, the electrical conductive element comprises a plurality of stranded conductive wires.

The term "optical conductor" in an optical cable includes an optical fiber and a coating layer surrounding the optical fiber. In some configurations, the cable core of an optical cable includes a plurality of optical conductors configured for data and/or signal transmission.

As used herein, the term "neutral region" is intended to designate a region around an axis ("neutral axis") where the bending-induced elongations are minimal. The neutral axis can be defined as an imaginary line along the cable length where, being the cable subject to bending, no significant longitudinal deformation takes place and bending stresses are minimal (theoretically null). Preferably, the cable is designed so that the neutral axis is located in a position where torsion acting on the cable determines a minimal longitudinal elongation of a strain sensor arranged in the neutral region.

The Applicant has realized that by ensuring mechanical coupling, and in particular mechanical congruence, between the longitudinal structural elements of the electric cable and the optical fiber of the strain sensor, the strain transfers from the longitudinal structural elements to be monitored to the strain optical fiber. With "mechanical congruence" it is meant the capacity of two or more parts of moving or withstand strain substantially as a whole. The just described mechanical congruence allows obtaining a cable capable of providing reliable readings of the experienced static and dynamic tensile and/or bending loads within a relatively large range of elongations and/or bending. According to one aspect, the strain sensor is embedded in a strain-transferring filler mechanically coupling the strain sensor with at least one longitudinal structural element of the cable.

For the purpose of the present description and of the appended claims, except where otherwise indicated, all numbers expressing amounts, quantities, percentages, and so forth, are to be understood as being modified in all instances by the term "about," if not already modified. Also, all ranges include any combination of the maximum and minimum points disclosed and include any intermediate ranges therein, which may or may not be specifically enumerated herein.

BRIEF DESCRIPTION OF THE DRAWINGS

The disclosed embodiments will be now described more fully hereinafter with reference to the accompanying drawings, in which some, but not all embodiments of the invention are shown. Drawings illustrating the embodiments are not-to-scale schematic representations.

DESCRIPTION OF THE EMBODIMENTS

Reference will now be made in detail to the present exemplary embodiments, examples of which are illustrated in the accompanying drawings. The present disclosure, however, may be embodied in many different forms and should not be construed as limited to the embodiments set forth herein.

Figure 1A:
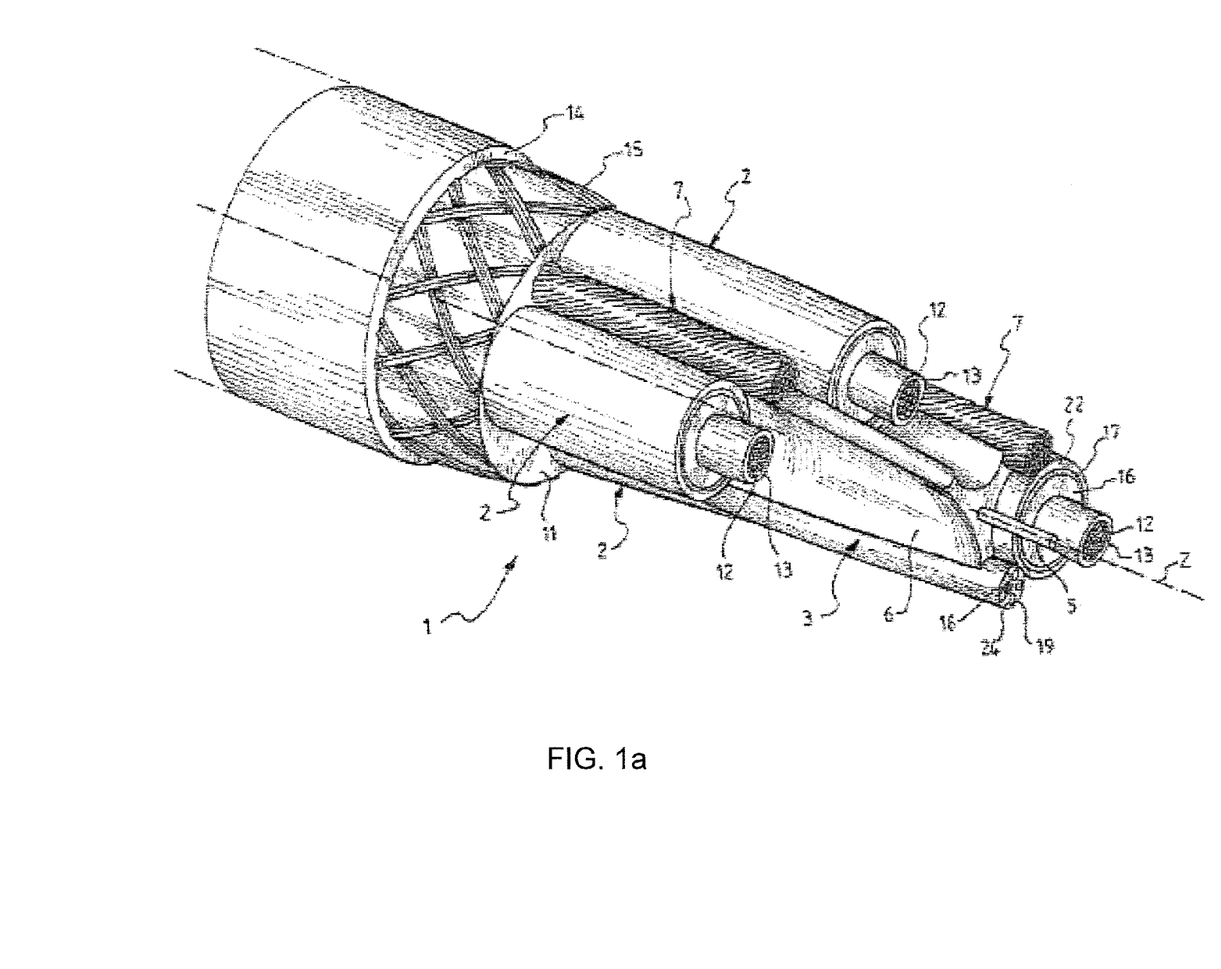
FIG. 1a is a schematic perspective view of an electric cable, consistent with certain disclosed embodiments.
Figure 1B:
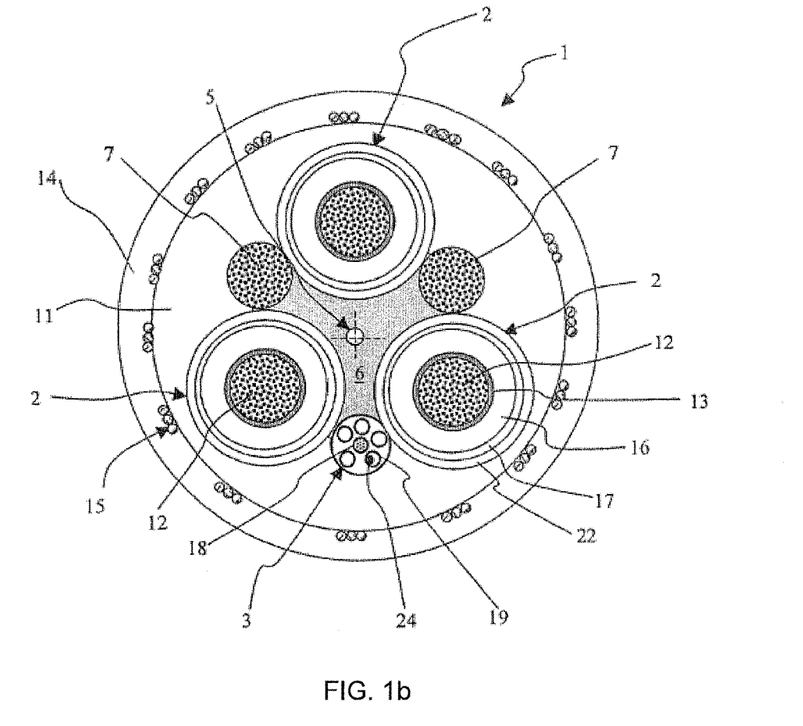
FIG. 1b is a schematic cross-sectional view of the electric cable shown in FIG. 1a, consistent with certain disclosed embodiments.

FIGS. 1a and 1b illustrate, respectively, a perspective view and a cross-sectional view of an electric cable 1, consistent with certain disclosed embodiments. Cable 1 shown in FIGS. 1a and 1b may be suitable for heavy-duty applications, more particularly for mobile installations. Cable 1 may be a round cable comprising, for example, a plurality of electric conductors 2 radially arranged about a central longitudinal axis Z (visible in FIG. 1a) of the cable. In the example shown in FIG. 1a, the cable 1 includes three electric conductors 2, although any other number is envisaged. The electric conductors 2 may provide three-phase power transmission.

Cable 1 may be a low or medium voltage power cable, where low voltage indicates a voltage of up to 1 kV and medium voltage indicates a voltage of from 1 kV to 60 kV. Each electric conductor 2 may comprise an electrical conductive element 12, for example a copper conductive element formed by a bundle of tinned or bare copper electrical wires stranded together according to conventional methods. Other conductive materials may also be used for manufacturing the conductive element 12. In radial external position with respect to each electrical conductive element 12, an inner semi-conductive layer 13, an insulating layer 16, an outer semi-conductive layer 17 are sequentially provided. The inner semi-conductive layer 13, insulating layer 16, and outer semi-conductive layer 17 may be made of polymeric-based materials that may be extruded one on top of the other or co-extruded onto the conductive element 12. The insulating layer 16 may be for example of cross-linked ethylene propylene rubber (EPR). The inner and outer semi-conductive layers 13 and 17 may be, for example, made of EPR, ethylene/propylene/diene terpolymers (EPDM) or a mixture thereof, charged with a suitable amount of a conductive filler, which may be carbon black.

Alternatively, whenever the operating conditions enable to do so, both the insulating layer 16 and semi-conductive layers 13 and 17 may be made of thermoplastic compounds, such as polypropylene based compounds.

In some applications, each of the cable electric conductors 2 may comprise at least one metallic screen layer 22 in a radially external position with respect to the outer semi-conductive layer 17.

It is to be understood that the above description of electric conductors 2 represents only one of the possible structures of the electric conductors 2 comprised in the electric cable 1, which in general may be phase electric conductors for power transmission or grounding, electric conductors for carrying control signals or electric conductors carrying both power and control signals.

Electric cable 1 includes a fiber optic strain sensor 5 (also referred to as the strain sensor 5) configured for measuring the tensile strain and/or bending strain experienced by the electric cable 1.

Due to the fact that heavy-duty cables undergo frequent mechanical stresses during their life lime, it is of particular relevance to locate the strain sensor 5 within the cable 1 in such a way that the optical fiber included in the strain sensor 5 is not damaged by bending of the cable 1 to any radius of curvature being not smaller than the minimum radius of curvature, $\rho_{min}$, which corresponds to the minimum radius at which the cable 1 may be bent without permanent damage. Cable bending induces an elongation in the strain sensor 5. It has been observed that the strain sensor 5 is generally undamaged by cable bending at radii of curvature not smaller than $\rho_{min}$, when the longitudinal strain induced by bending is smaller than the strain applied to the fiber in a strain test of typically 1 or 2%.

The region of the cable 1 extending along the cable length wherein the optical fiber of the strain sensor 5 remains undamaged due to cable bending, is defined as the (bending) neutral region surrounding and including a bending neutral longitudinal axis of the cable 1. In round cables, in a cross-sectional plane of the cable 1, the neutral region is a radial region about the neutral axis, which corresponds, in the present embodiment shown in FIG. 1, to the central longitudinal axis Z.

In some embodiments, within the neutral region of the cable 1, the strain sensor 5 undergoes an elongation equal to or lower than 2% when the cable is bent at a radius of curvature of $\rho_{min}$. In some embodiments, this elongation is equal to or lower than 1%.

Further to electric conductors 2 for transmission of power and/or control signals, the electric cable 1 comprises at least one earth conductor 7. In the embodiment shown in FIGS. 1a and 1b, the cable 1 comprises two earth conductors 7, for example in the form of a bundle of stranded tinned or bare copper electrical wires. Especially for medium-voltage applications, the bundle of electrical wires of the earth conductors 7 may be surrounded by a semi-conductive layer (not shown in the figures). The earth conductors 7 may be arranged radially external with respect to the strain sensor 5 and stranded together with the electric conductors 2 along a cable longitudinal direction. In some embodiments, the electric conductors 2 and earth conductors 7 may be helically wound about the central longitudinal axis Z of the cable 1, in accordance with conventional methods.

In the embodiments shown in FIGS. 1a-1b, the cable 1 comprises an optical fiber element 3 including a plurality of optical fibers, e.g., from 6 to 24 fibers, for transmission of control signals, voice, video and other data signals. A single optical fiber or a plurality of optical fibers may be inserted in a loose-tube buffer construction in one or more longitudinally extending modules 19, preferably made of a flexible material such as polybutylene terephthalate (PBT), ethylene tetrafluoroethylene (ETFE) or a polypropylene copolymer. In the illustrated example, the modules 19 containing the optical fiber are SZ helically wound around a longitudinal strength member 18, being for example a glass fiber, an aramid filament or a carbon fiber. The optical fiber element 3 may be stranded together with the electric conductors 2 and earth conductors 7. In some embodiments, if the cable construction allows it, the earth conductors 7 and the optical fiber element 3 may be arranged in the outer interstices formed by the electric conductors 2.

Electric conductors 2 and, if present, earth conductors 7 and/or the optical fiber element 3 are collectively referred to as the longitudinal structural elements of the electric cable 1.

The tensile strain and/or bending strain experienced by the electric cable 1 will be transferred to the strain sensor 5. For strain transfer, the strain sensor 5 is mechanically congruent with at least one longitudinal structural element (e.g., the electric conductors 2, earth conductors 7, and/or the optical fiber element 3) in the cable 1 in such a way that the strain experienced by the least one longitudinal structural element is at least partially, but significantly, transferred to the strain sensor 5. To this end, the strain sensor 5 may be embedded in a strain-transferring filler 6 that mechanically couples the strain sensor 5 with at least one longitudinal structural element of the electric cable 1. In some embodiments, the strain-transferring filler 6 mechanically couples the strain sensor 5 with each of the electric conductors 2 integrated in the electric cable 1, for example, with each of the circumferentially arranged longitudinal structural elements (including, e.g., the electric conductors 2, earth conductors 7, and/or the optical fiber element 3).

In order to ensure univocal correlation between the elongation or compression of the strain sensor 5 and of that of the electric cable 1, the contact between strain-transferring filler 6 and the at least one longitudinal structural element should show no significant sliding losses at least in strained condition. In most cases of interest, a substantial absence of sliding loss between the strain sensor 5 and at least one longitudinal structural element implies an adherence with friction or bonding between them. A mechanical coupling between two elements causing substantially the same deformation as a result of no significant sliding losses between the elements, is herein referred to as mechanical congruence.

As used herein, with "substantially unstrained condition" it is intended to describe a reference condition of an electrical or optical cable with an average reference strain in the optical fiber of the strain sensor, which may correspond to a condition before handling the cable from its original drum provided by the manufacturer, such as before the transfer to winding and anchoring reels or tender and pulley systems. In most practical cases, however, the reference condition refers to the cable after installation, e.g., after transfer from the original drum, and before employment, thus before being exposed to relevant tensional loads. A reference condition can correspond to the state of the cable mounted on the crane, the crane being set at the maximum extension thereof, i.e. the cable is deployed for most of its length. The substantially unstrained condition provides a reference value with respect to which the strain of the cable in use is measured. In Brillouin methods, wherein distributed strain along the cable length is measured, the substantially unstrained condition can refer to a plurality of reference values measured at different locations along the cable length.

A strained condition is intended any condition different from the substantially unstrained condition, as defined herein. Tensile and/or bending stresses in the electric or optical cable can be measured as strain deviations, namely increments if the cable is elongated or decrements if the cable is compressed, from the average reference value.

A cable typically undergoes one or more thermal treatments, in particular curing processes, during the manufacturing thereof, which involve thermal treatments at typical temperatures of about 150-200° C. for a few minutes. The Applicant has noted that it is preferred that the strain transferring filler and the strain sensor comprise materials resistant to the curing processes taking place during manufacturing of the cable in which the strain sensor is integrated, while maintaining (1) the elastic properties of the strain sensor which enable reversibility of the strain sensor with no permanent deformation of the same, at least in the range where the cable exhibits an elastic behavior, and (2) the adhesion or high-friction resistance to unwanted slippage so as to maintain mechanical congruence between layers and cable elements.

In some embodiments, the strain-transferring filler may be made of a material having elastic properties such that the strain-transferring filler reacts to the maximum strain with an elastic behavior without permanent deformation of the filler (i.e., reversibility of the deformation). The material for the strain-transferring filler may be selected to suitably stretch along the cable undergoing elongation and/or bending and to substantially recover the deformation when the external tensile loads and/or bending (e.g., compressive) loads are removed, at least for tensile and/or bending loads corresponding to the allowed maximum strain, beyond which a permanent and irreversible deformation of the cable takes place.

The strain-transferring filler may be based on a polymeric material, advantageously extruded around the strain sensor. Thermosetting elastomers having an elastic behavior within a relatively large range of strain, e.g., exceeding about 1%, were found to be particularly suitable for the cable. Advantageously, thermosetting elastomers are observed to adhere with high friction to the surfaces of the longitudinal structural elements. Advantageously, the material of the strain-transferring filler is resistant to thermal treatments that may take place during cable manufacturing, such as during curing of the outer sheath of the electric or optical cable, which may be carried out at approximately 200° C.

In some embodiments, the strain-transferring filler 6 comprises a thermosetting elastomer cross-linked by means of steam pressure, irradiation with electron beam, salt bath dipping or silane cross-linking systems. In some embodiments, the strain-transferring filler 6 is made of elastomers having an elastic modulus between 0.01 and 0.7 GPa. For example, the strain-transferring filler 6 may be selected from the group consisting of ethylene propylene diene rubber (EPDM), ethylene propylene rubber (EPR), nitrile-butadiene rubber (NBR).

Although thermosetting elastomers are preferred because of their temperature resistance adhesion properties and large elasticity range, the use of thermoplastic elastomers is not excluded. Examples of thermoplastic elastomers include styrenediene-styrene triblock copolymers, thermoplastic polyester elastomers, thermoplastic polyurethane elastomers, and thermoplastic polyolefin rubbers (polyolefin blends).

In some embodiments, the strain-transferring filler 6 may be electrically conductive.

Interstitial areas 11 may be filled with polymeric filler such as an EPR based compound. An outer jacket 14 may be provided, for example by extrusion. To increase the resistance of the electric cable 1 to mechanical stresses, the outer jacket 14 is preferably made of a cured polymeric material preferably based on a reinforced heavy-duty thermosetting elastomer, such as high density polyethylene (BDPE), polychloroprene, polyurethane or NBR-based compound.

Optionally, to increase the torsion resistance of the electric cable, an armor 15 in form, for example, of braids or double spiral of reinforcing yarns, such as metal or polyester yarns, such as metal or polyester yarns, for instance made of Kevlar® (aromatic polyamide), is provided. The armor 15 is an example of peripheral mechanically non-symmetrical strength member.

The Applicant has realized that, in order to ensure that strain transfer takes place between the optical fiber of the strain sensor and the longitudinal structural elements of the electric or optical cable, across the whole range of measurable values of elongations, it is advantageous that strong and substantially uniform adhesion is present among the layers surrounding the optical fiber of the strain sensor and mechanically coupling the optical fiber with the strain-transferring filler. This allows mechanical congruence between the optical fiber of the strain sensor and the strain-transferring filler.

Figure 2A:
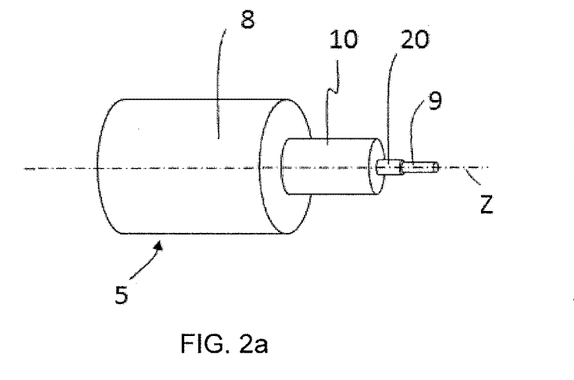
FIG. 2a is a schematic perspective view of a strain sensor, consistent with certain disclosed embodiments.
Figure 2B:
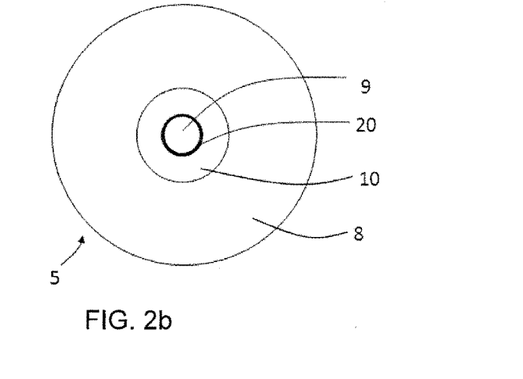
FIG. 2b is a schematic cross-sectional view of the strain sensor shown in FIG. 2a, consistent with certain disclosed embodiments.

FIGS. 2a and 2b illustrate a partial perspective view and a cross-section, respectively, of a strain sensor 5 integrated in a cable according to the disclosed embodiments. The strain sensor 5 comprises an optical fiber 9, a release layer 20, and two protective layers, i.e. a buffer layer 10 and a sheltering sheath 8. The release layer 20 surrounds the optical fiber 9, and the buffer layer 10 surrounds the release layer 20. The sheltering sheath 8 surrounds the buffer layer 10. In some embodiments, the strain sensor 5 may not comprise the buffer layer 10, leaving the sheltering sheath 8 directly contacting and surrounding the release layer 20 (in tight configuration).

The optical fiber 9 is substantially arranged along the longitudinal axis Z, when the strain sensor 5 is integrated in the cable 1. Optical fiber 9 of strain sensor 5 may be a silica-based optical fiber, with typical nominal diameter of 125 µm. The optical fiber 9 may be coated by a primary coating, which is surrounded by a secondary coating adherently contacting the primary coating, where the primary and secondary coating form a coating system. The outer diameter of the (coated) optical fiber 9 may be 250+/−10 µm or 200+/−10 µm. Single-layer coating systems may be used as well. In some embodiments, the optical fiber 9 is a single-mode optical fiber, such as a transmission fiber compliant with G.652, G.653, or G.655 ITU-T (International Telecommunications Union, ITU Telecommunication Sector) recommendations. In some embodiments, the optical fiber 9 of the strain sensor 5 is a pure-silica core fiber.

In some embodiments, the optical fiber 9 of the strain sensor 5 has enhanced bending performance, exhibiting low bending losses. For example, the optical fiber 9 may be compliant to the G.657 ITU-T recommendations.

For identification purpose, it can be advantageous to have a colored optical fiber 9. In this case it is preferred to use an optical fiber with a colored secondary coating. Advantageously, any color other than white may be selected.

The optical fiber of the strain sensor is capable of withstanding repeated elongations up to about 1%, preferably up to about 2%, for a number of times exceeding the movement cycles expected to occur in the electric or optical cable during its operating life. It is noted that the value of strain of about 1% is larger than the typical maximum elongations the electric cable may bear before rupture or permanent damage, e.g., about 0.5-0.7%.

The coating system can be made of two different UV-cured acrylate materials up to a diameter of 250 µm. In one embodiment, the coating system of the glass optical fiber is as disclosed in EP 1 497 686, which was observed to provide the optical fiber with no rupture when subject to repeated elongations exceeding about 2%.

Applicant has found that improved usability for strain sensor arises when the release layer surrounds the coating system (e.g., the primary and secondary coatings) of the optical fiber as this improves the strippability of the layers of the strain sensor radially external to the coating system. The release layer may be located between the coating system of the optical fiber (e.g., surrounding the secondary coating) and a protective layer, such as a tight buffer layer or a sheltering sheath.

One objective of the design of the strain sensor is to facilitate removal of the release layer, the optional buffer layer, and the sheltering sheath all together, but not the coating system of the optical fiber, and such removal should be attained without causing damage to the optical fiber or altering the properties of the optical fiber. On the other hand, another objective is to provide a strain sensor mechanically congruent with at least one elongated element of the cable to accurately measure the strain experienced by the electric or optical cable. The Applicant has realized that in order to strike a balance between the strippability and strain transferability, it is important to design the release layer to be sufficiently thin such that it does not lessen the mechanical congruence (hence the strain transferability) between the optical fiber and the optional buffer layer, sheltering sheath, the strain-transferring filler, and at least one longitudinal structural element of the electric or optical cable. On the other hand, the release layer should contain sufficient non-sticking material to provide a proper detachment of the inner surface of the release layer from the optical fiber.

Preferably, the release layer is applied over the secondary coating of the optical fiber to facilitate easy removal of the buffer layer and sheltering sheath (or sheltering sheath alone if buffer layer is not present) from the sensing optical fiber. One or both of the buffer layer and the sheltering sheath may be made of a glass reinforced polymer (GRP) or fiber reinforced polymer (FRP). Thus, both of the buffer layer and the sheltering sheath (or the sheltering sheath if the buffer layer is not present) are referred to as the GRP/FRP elements for convenience.

The release layer may comprise a silicone, a fluoropolymer mixture or an extruded polymer material in form of a thin polymeric layer which controls adhesion of the radially external layer to the secondary coating of the sensing optical fiber. As the outer GRP/FRP element/s is/are in intimate contact with the sensing optical fiber (through the release layer), substantially no excess fiber length is present, and the strain of the sensing optical fiber is the same as the at least one longitudinal structural element of the electric or optical cable. As substantially no fiber excess length is desired, the sensing optical fiber should remain in contact with the GRP/FRP element/s without air gaps between them. The release layer couples the optical fiber effectively to the GRP/FRP element/s, facilitating strain sensing, and also easy release of the optical fiber from the GRP/FRP element/s.

To effectively route and connectorize the optical fiber, the release layer, the optional buffer layer, and the sheltering sheath surrounding the coated optical fiber should be removed for at least about ten centimeters without damage to the optical fiber or its coatings. The optical fiber may be removed from the GRP/FRP element/s with the aid of an access tool, in particular a suitable buffer stripping tool.

Typical optical fibers are proof tested to 0.7 GPa (100 KPsi & 1% strain), 8.89 N. Fiber proof test loads should not be exceeded while stripping fibers, yet fibers still need to have some coupling to the GRP/FRP elements to prevent the optical fiber from moving freely relative to the GRP/FRP elements. Typical resolution limits for distributed strain sensing are 1 meter, so the effective coupling length of the optical fiber to the GRP/PRP elements needs to be about 1 meter, otherwise spatial distributed strain sensing resolution may be compromised. To couple the optical fiber to the GRP/FRP element/s with a coupling length of 1 meter at a maximum strain limit of 1%, the minimum strip force could be 8.89 N/100 cm×10 cm or about 1 N/10 cm (the relationship between strip force and cable coupling is not always straightforward as coupling can also depends on cable deployment, bending, and other structural factors). Typically it is desirable to remove at least 10 cm of the GRP/FRP elements while keeping the strip force below proof test levels. The maximum stripping force should be below about 9 N/10 cm.

Figure 5:
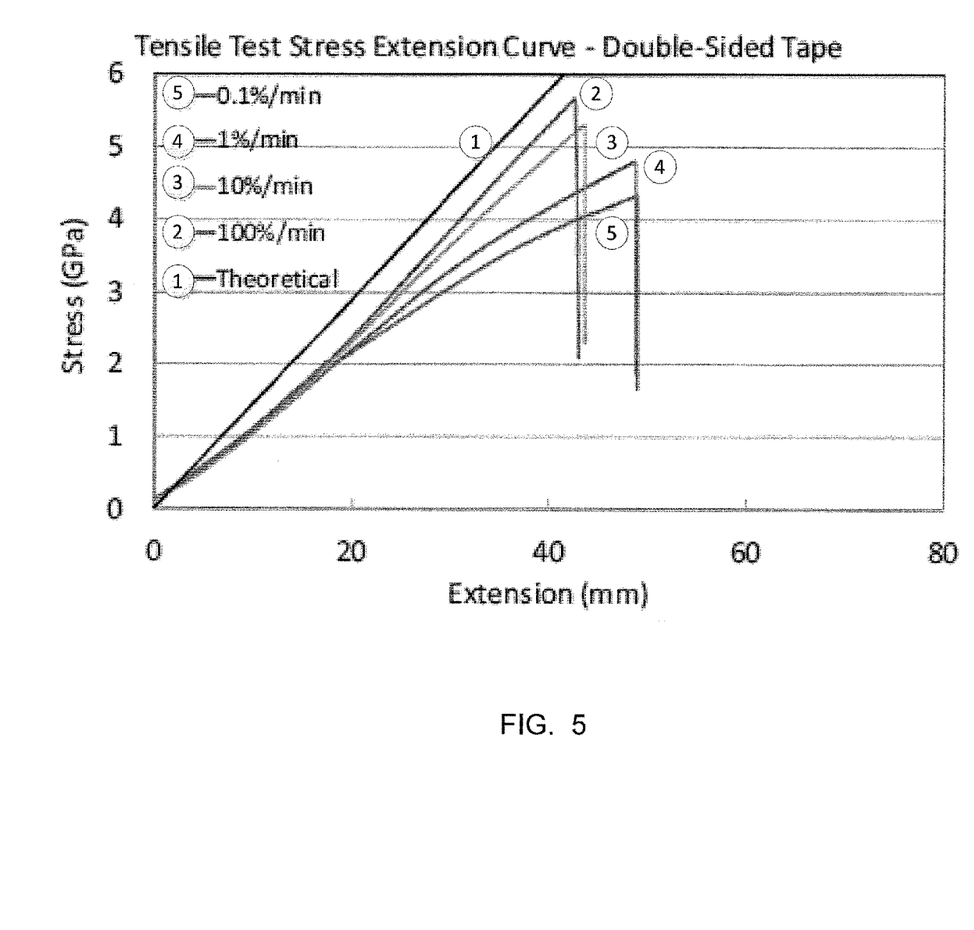
FIG. 5 is a plot showing tensile test stress versus extension curve for a strain sensor without a release layer, consistent with certain disclosed embodiments.

Without the addition of the release layer, 10 cm of the GRP/FRP elements cannot be removed without possible breakage or damage of optical fiber. Typical stress versus extension data for a typical optical fiber without a release layer 20 is shown in FIG. 5, disclosing tensile test stress versus extension curves. Without the addition of a controlled release layer between the coating system of the optical fiber and the GRP/FRP element/s, the adhesion between the GRP/FRP element/s and the secondary coating of the optical fiber is too great that one cannot easily remove the optical fiber with the coating intact without damage to the fibers and/or coating. As shown in FIG. 5, in each of the tensile tests (0.1%/min, 1%/min, 10%/minor 100%/min strain rate), the optical fiber breaks (characterized by the sudden drop in stress) at an extension of around 40 mm or 50 mm. At a strip force of above about 15 N for 10 cm, stretching and damage to the fiber coatings is observed.

In some embodiments, the release layer may be made of a material selected from a silicone polymer, a fluoropolymer mixture or an extruded polymer containing a slip agent based on a fatty acid amide, a silicone or a fluoropolymer, in an amount of from about 1 wt % to about 10 wt %. In some embodiments, the release layer may contain a fluoropolymer and the silicone polymer as slip agent.

The Applicant has found that a suitable amount of slip agent in an extruded polymer layer for the release layer could provide low friction (or sufficient slippage) between the release layer and the coating system (e.g., the secondary coating) of the optical fiber. In particular, the Applicant has found that when the amount of slip agent contained in the silicone polymer is in the range of about 1 wt % to about 10 wt %, sufficient slippage is provided between the release layer and the coating system of the optical fiber for stripping purposes. If the amount of the slip agent is too low, such as substantially less than 1 wt %, there may not be sufficient slippage between the release layer and the optical fiber. If the amount of the slip agent is too high, such as more than 10 wt %, there may be too much slippage between the release layer and the optical fiber, which may lessen the mechanical congruence (and hence the strain transferability) between the strain sensor, and the at least one longitudinal structural element of the electric or optical cable. In addition, too much slip agent may also increase the thickness of the release layer, which in turn may reduce the mechanical congruence (and hence the strain transferability).

When the release layer is made of a fluoropolymer mixture, the fluoropolymer mixture advantageously comprises a fluoropolymer and a solvent, preferably a fluorinated solvent. The amount of fluoropolymer contained in the mixture can be of from 0.1 wt % to about 5 wt %, which the Applicant has found to be suitable to provide sufficient slippage between the release layer and the optical fiber for stripping purposes. After application, the fluoropolymer mixture is dried resulting in an at least partial evaporation of the fluid contained therein. The total thickness of the dry fluoropolymer mixture film can be less than or equal to 1 μm, for example it is from about 0.1 μm to about 1 μm. The Applicant has found the thin dry fluoropolymer mixture film does not significantly affect (e.g., lessen) the mechanical congruence (and hence the strain transferability) between the optical fiber and the optional buffer layer, the sheltering sheath, the strain-transferring filler, and the at least one longitudinal structural element of the electric or optical cable.

Examples of fluoropolymer mixture material for release layer are Novec™ 1700 or 1702 fluoropolymer coatings from 3M™ comprising fluorochemical acrylic polymer carried in a hydrofluoroether solvent, in particular methoxynonafluorobutane.

In one embodiment, the optical fiber is coated with the fluoropolymer mixture before the application of the GRP/FRP elements at a coating thickness of about 1 micron or less. For example, a fluid fluoropolymer mixture may be applied to the secondary coating of the optical fiber, after the secondary coating is cured, to provide the fluoropolymer release layer on the secondary coating of the optical fiber. In exemplary embodiments, a release layer with fiber removal force of 9 N was produced by the Applicant using a fluoropolymer coating having a thickness of about 100 nm (or 0.1 μm), and another release layer with fiber removal force under 4 N was produced by the Applicant using a fluoropolymer coating having a thickness of about 0.9 μm.

When the release layer is made of a silicone polymer, this polymer is preferably a polydimethylsiloxane (PDMS), more preferably in form of fluid having a cinematic viscosity suitable for the present application, for example of at least 30 cSt. PDMS suitable for the present invention has a cinematic viscosity up to 100 cSt or more. PDMSs suitable for the present invention are marketed as BLUESIL™ FLD47V (by Bluestar Silicones) or Lurol 13754 (by Goulston Technologies, Inc.). Alternatively, the silicone polymer of the release layer can be a RTV silicone. A release layer based on silicone polymer can be applied by extrusion or other process with a thickness of from 10 μm to 100 μm.

In a further alternative, release layer can be made of an extruded polymer containing a slip agent, as already mentioned above. The extruded polymer is preferably a PVC, in particular a flexible PVC having a Shore D ranging from 50 to 80 and the specific gravity ranging from 1.2 to 1.6, Also preferred is polyolefin or EVA copolymer or polyester copolymer or mixture thereof added with a flare-retardant filler, advantageously selected from magnesium or aluminum hydroxide. An extruded polymer containing a flame-retardant filler can also be referred to as low smoke zero halogen (LSZH) polymer. A release layer based on of an extruded polymer containing a slip agent is preferably applied by extrusion with a thickness of from 150 μm at most.

The slip agent can be selected from a fatty acid amide, preferably having a saturated or unsaturated $C_{10}$-$C_{22}$ chain (e.g., oleamide or erucamide), a silicone or a fluoropolymer. Examples of silicone slip agent suitable for the present invention are siloxane polymers optionally dispersed in a masterbach, such as MB50-001 MASTERBATCH (by Dow Corning®). Examples of fluoropolymers slip agent suitable for the present invention are the already mentioned Novae™ 1700 or 1702 (by 3M). OnCap™ SLPE013013 (CC00013013) is an example of erucamide-containing slip agent.

The slip agent is insoluble in the extruded polymer and is advantageously capable of migrating, after processing, towards the surfaces of the release layer at the interface with both the protective layer (the sheltering sheath or the tight buffer) and the optical fiber 9. The slip agent is not soluble in either the optical fiber coating or GRP/FRP element, and is not chemically reactive with the materials of these layers.

When coated with a LSZH polymer at 4% loading by weight percent with a slip agent containing erucamide the force required to remove 10 cm of the sheltering sheath 8, the buffer layer 10, and the release layer 20 to expose the secondary coating of the optical fiber 9 is reduced to 3.2 N.

The thinner the release layer, the better the coupling of stresses and strain to the optical fiber and the smaller the reduction in overall modulus of the strain sensor due to the contribution of the release layer.

As shown in FIG. 2a, the optical fiber 9 is separately provided with the buffer layer 10 surrounding the coating system (e.g., the primary and secondary coatings of the optical fiber 9) for improving mechanical protection of the optical fiber 9, e.g. against microbending losses. Buffer layer 10 is a tight-buffered layer (hence buffer layer may also be referred to as a tight buffer 10). Uniform adherence of the buffer layer 10 to the release layer 20 (and hence to optical fiber 9, namely to the coating system of the optical fiber 9), helps ensure mechanical congruence between the optical fiber 9 and the strain-transferring filler 6.

In some embodiments, the buffer layer 10 may be made of a material having elastic properties that permit the tight-buffered optical fiber 9 to bear elongations of up to and including 2%. In some embodiments, the buffer layer 10 may be based on a thermal resistant material capable of exhibiting thermal resistance sufficient to withstand the thermal treatments taking place during cable manufacturing. In some embodiments, the buffer layer 10 is made of a radiation curable acrylate polymer. For example, the tight buffer 10 may be made of a UV-curable acrylate polymer such described in WO 2005/035461, or of a polymeric matrix charged with a flame retardant filler such that described in WO 2008/037291. Advantageously, the buffer layer 10 may be selected so as to adhere to the release layer 20 (and hence to the coating system of the optical fiber 9) with essentially no or limited creeping, slipping or debonding, such that when the strain sensor 5 is stripped, the buffer layer 10 and the release layer 20 will be removed all together to expose the coating system of the optical fiber 9, but without removing any of the coating system. An access tool such as Ideal Lite-Strip® (by Ideal Industries Inc.) or other wire stripping type tool of suitable diameter may be used to facilitate the removal of the release layer from the optical fiber.

The optical fiber 9 of the strain sensor 5 is preferably shielded against lateral loads, which can give rise to microbending losses and thus can affect the Brillouin frequency shift measured in the optical fiber 9. Furthermore, as described above, when the optical fiber 9 is influenced by lateral compression, the strain sensor 5 may provide a measurement of the tensile strain and/or the bending strain that is not directly correlated with the effective elongation or bending of the electric cable. To this end, the sheltering sheath 8, designed to improve resistance to lateral compressions, can be advantageously provided to surround the optionally tight buffered optical fiber 9 (e.g., surround the buffer layer 10).

In cables, such as that illustrated in FIGS. 1a, 1b, 3, and 4 lateral compressions in directions transverse to the longitudinal cable direction, typically occur in radially inward directions.

In order to ensure mechanical congruence between the optical fiber and the strain-transferring filler, the material of the sheltering sheath is selected so as to provide strong and relatively uniform adhesion with the optionally buffered optical fiber.

As already said, the sheltering sheath can be made of a fiber-reinforced composite, such as a fiber-reinforced polymer (FRP), wherein the reinforcing fibers may be carbon, graphite, boron, or glass (non optical) fibers.

In some embodiments, the sheltering sheath is a glass-reinforced polymer (GRP), in which the polymer is reinforced by glass fibers embedded in the polymer. The Applicant has observed that advantageously relatively high tensional stiffness of the strain sensor is achieved by the presence of reinforcing fibers deployed parallel to the optical fiber longitudinal axis Z, thereby preventing lateral compression to be misread as tensile strain and/or bending strain. The sheltering sheath may be pultruded onto the buffer layer or on the optical fiber coating and in direct contact thereto.

When the sheltering sheath is made of a fiber-reinforced polymer or a glass-reinforced polymer, the polymer embedding the reinforcing fiber may be a cross-linked resin, for example unsaturated polyester, such as vinyl esters, or epoxy resin.

In some embodiments, the outer surface of the sheltering sheath, which is surrounded by the strain-transferring filler in which the strain sensor is embedded, may comprise a plurality of grooves or cuts or may be treated to form a rough surface in order to increase the adherence of the sheltering sheath with the strain-transferring filler. Alternatively or in addition, an adhesion promoting layer may be optionally provided on the sheltering sheath.

As described above, the strain sensor should have an elastic response to return to its original condition after tensile loads and/or bending loads, which are associated with the maximum expected cable strain, are removed from the electric or optical cable. In order to provide the strain sensor with the required flexibility, it is preferred that the sheltering sheath is made of a polymeric-based material having elastic properties. In some embodiments, the polymer embedding the reinforcing fibers are cross-linked resins, in particular UV-curable cross linked resins or thermosetting cross linked resins, which in general provide for a resistance to compressions. The cross-linked resins can be unsaturated polyesters, epoxies, or vinyl esters.

In some embodiments, in order to enable the strain sensor to detect also small compressions of the electric or optical cable, the buffered optical fiber s placed in the fiber-reinforced composite with a slightly stretched condition corresponding to a pre-elongation of about 0.2%.

The strain sensor may detect a relatively large range of measurable elongations, for example, from about −0.2% to about 1%. Since elongations as high as about 1% may be measured and considering that macroscopic rupture of electric or optical cable takes place for elongations of about 0.5-0.7% and generally smaller than about 1%, the strain sensor is capable of detecting a permanent deformation of the electric or optical cable, once the maximum allowable strain has been measured at a position of the cable.

The strain transfers at least partially from one layer to the next, thereby ensuring a reliable measurement of cable elongations and/or bending within a relatively large range, and at the same time an elastic return to the substantially unstrained condition upon removal of the tensile loads and/or the bending loads, at least in the range of tensile loads and/or bending loads below permanent deformation of the electric or optical cable. Due to a proper selection of the materials of the strain sensor and the strain-transferring filler, which provide mechanical congruence between the different elements, an efficient strain transfer and a knowable relation between the elongation and/or bending of the optical fiber and the tensile and/or bending strain experienced by the cable are ensured. In some embodiments, the strain transfer from the radially external longitudinal structural elements of the electric or optical cable to the optical fiber of the strain sensor is expected to range from about 50% to about 100%.

As shown in FIG. 1b, the electric cable 1 may comprise a temperature sensor comprising an optical fiber 24 for measuring the internal temperature of the cable 1. The optical fiber 24 of the temperature sensor may be in a loose buffer construction. In particular, in the embodiment illustrated in FIG. 1b, the optical fiber 24 is placed loosely inside a module 19 longitudinally enclosing the optical fiber 24. The module 19 is included in the optical fiber element 3. The longitudinally extending module 19 contains excess optical fiber length per unit length of the tube optical fiber 24. The excess fiber length (EFL) is defined by the following relationship:

$$EFL = (Lf-Lt)*100/Lt \qquad (1)$$

wherein Lf is the length of the optical fiber 24 and Lt is the length of the module 19 housing the optical fiber 24. The excess length is selected so that the optical fiber remains loose (i.e., not strained) at the maximum strain imparted to the electric cable 1, for example, at about 1%.

Figure 3:
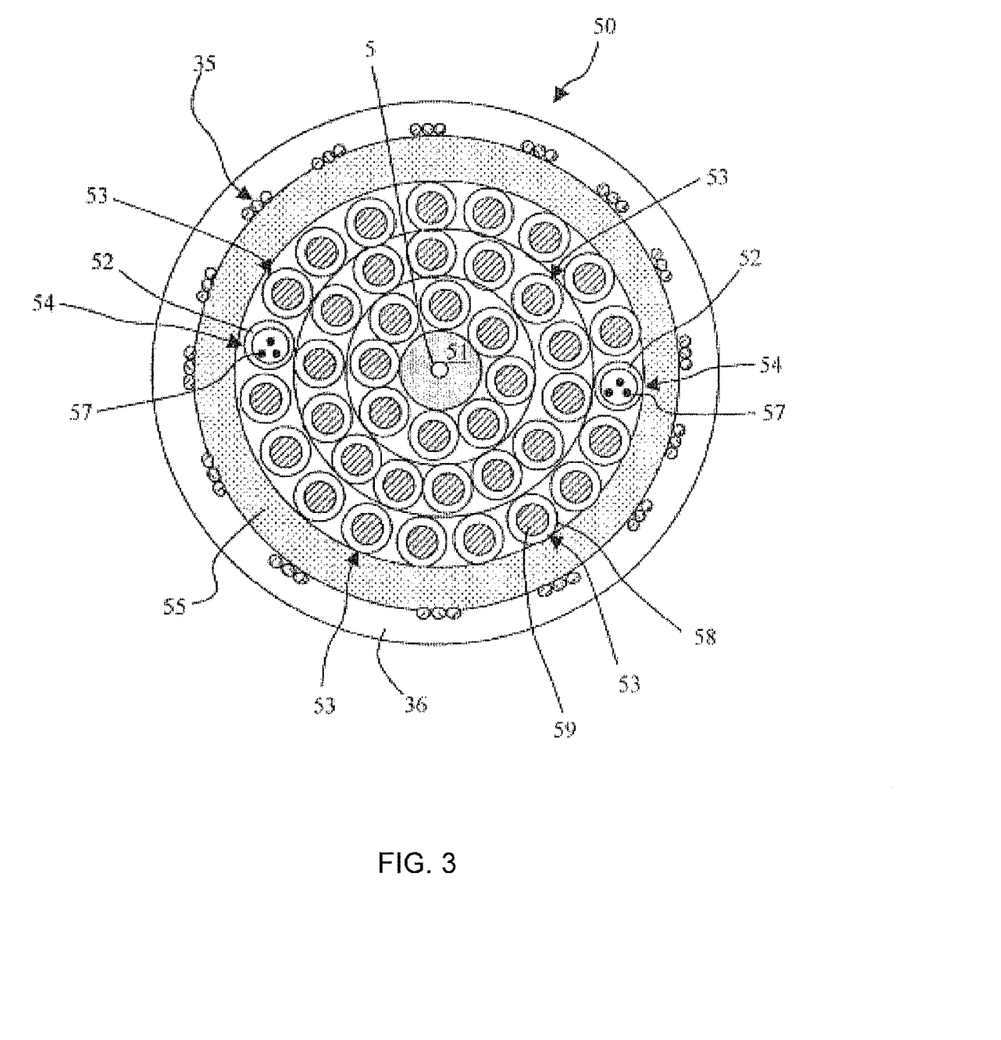
FIG. 3 is a schematic cross-sectional view of an electric cable, consistent with certain disclosed embodiments.

FIG. 3 is a cross-sectional view of an electric cable 50, consistent with certain disclosed embodiments. The illustrated cable 50 may be for example a low-voltage control cable for reeling applications. Electric cable 50 may comprise a plurality of longitudinal structural elements arranged in a plurality of concentric layers stranded around a central element 51 acting as strain-transferring filler (hence the central element 51 is also referred to as the strain-transferring filler 51) for the strain sensor 5. The longitudinal structural elements of each concentric layer may be twisted around the central element 51 and may comprise one or more control electric conductors 53 and a pair of two optical fiber elements 54 disposed in the most external concentric layer. More of less optical fiber elements 54 may be included in some embodiments. Each control electric conductor 53 may comprise a fine-wired copper conductor 59 surrounded by an insulating polymeric layer 58. The two optical fiber elements 54 are in the form of a longitudinally extending module 52 containing at least one optical fiber 57 (e.g., three optical fibers 57 shown in FIG. 5) loosely disposed within the module 52. An optical fiber of either of the two optical fiber elements 54 may be used as a temperature sensor. A polymeric inner sheath 55 may surround the concentric layers of longitudinal structural elements. An outer jacket 36 with an embedded reinforcement, such as a polyester-yarn braid 35, may surround the inner sheath 55 and encloses the cable 50.

Figure 4:
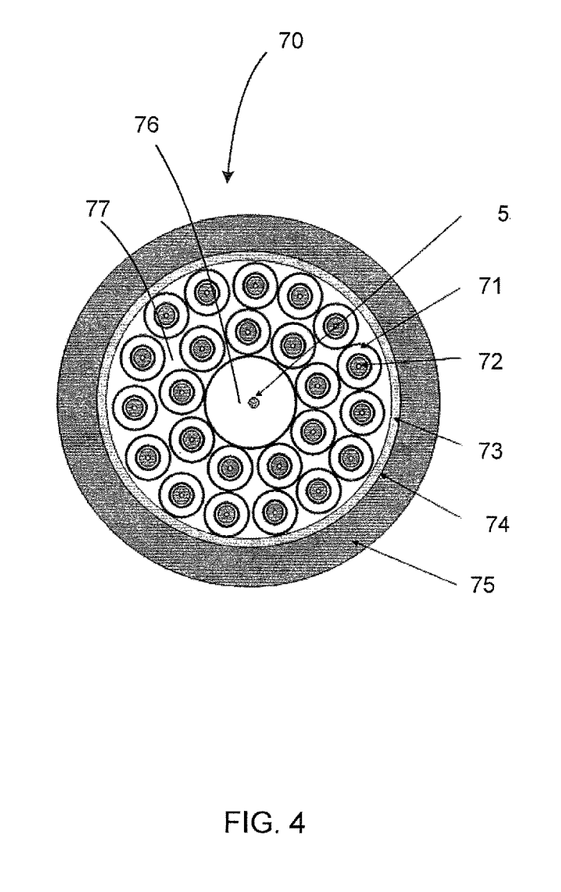
FIG. 4 is a schematic cross-sectional view of an optical cable having the disclosed strain sensor, consistent with certain disclosed embodiments.

As already mentioned, the disclosed strain sensor 5 may also be implemented in optical cables so as to measure the strain (bending and/or tensile) experienced by the optical fibers included in the optical cables. FIG. 4 is a schematic cross-sectional view of an optical cable 70 configured for data end/or signal communication, having the strain sensor 5, consistent with certain disclosed embodiments. The optical cable 70 may have a round cross section, although other cross sectional shapes are also envisaged. The optical cable 70 may include a plurality of optical conductors in form of tight buffered optical fibers 72, each including one or more layers (e.g., at least one buffer layer) surrounding an optical fiber positioned at a center location, and wrapped by a subunit jacket 71. In some embodiments, the tight buffered optical fibers 72 are 900-μm fibers, each configured for transmitting signals, data, etc., for example, for telecommunication. The example optical cable 70 shown in FIG. 4 includes a bundle of 24 tight buffered optical fibers 72, although any other numbers are also envisaged. The strain sensor 5 may be positioned at the center of the optical cable 70 surrounded by the bundle of tight buffered optical fibers 72. The optical cable 70 may include a binder 73 configured to bind the optical fibers 72 together. In some embodiments, there may be a core tape 74 surrounding the binder 73. The optical cable 70 may further include an outer jacket 75 surrounding the core tape 74.

The optical cable 70 may include a strain-transferring filler 76 surrounding the strain sensor 5 and mechanical coupling the strain sensor 5 to the optical fibers 72, thereby transferring the strain experienced by the optical fibers 72 to the strain sensor 5. Although shown as having a round boundary for the strain-transferring filler 76, in some embodiments, there may be no boundary for the strain-transferring filler 76, and the strain-transferring filler 76 may fill any space between the strain sensor 5 and the optical fibers 72 and any space (e.g., interstitial space 77) among the optical fibers 72. The material of the strain-transferring filler 76 may be similar to those described above for the strain-transferring filler 6, 25, 47, and 51.

In above described preferred embodiments, the strain sensor 5 comprises an optical fiber 9 covered by layers (e.g., a release layer 20, an optional tight buffer or buffer layer 10, and a sheltering sheath 8) exhibiting elastic properties and embedded in a strain-transferring filler 6 with elastic properties. However, as long as the structure composed by the strain sensor 5 and the strain-transferring filler 6 is capable of recovering the elongation and/or bending in the reversible elastic regime of the cable 1, 50 and 70, at least one of the layers selected from the group consisting of the buffer layer 10 surrounding the coated fiber 9, the sheltering sheath 8, and the strain-transferring filler 6, 51 and 76 may exhibit a non-elastic behavior and in particular a plastic behavior. In particular, the at least one layer may be made of a plastic material, namely a material having the capability to deform in response to mechanical forces without fracture, at least until a certain threshold value of the external forces is not exceeded. According to some embodiments, in order to provide the strain sensor 5 with resistance to lateral loads and pulling strength, the sheltering sheath 8 of the strain sensor 5 may be a metallic tube surrounding the buffer layer 10 of the optionally buffered optical fiber 9 (embodiment not shown in the figures). In this case, the metallic tube contains a gel or gel-like material, optionally under pressure, capable of providing the sought mechanical congruence between metallic tube and the optical fiber 9 contained therein. In one embodiment, the metallic tube is made of steel.

The strain sensor 5 may be arranged in the neutral region of the cable 1, 50 or 70 surrounding the central longitudinal axis. For example, the neutral region is a radial region, which extends along the central longitudinal axis, with radius of 3 mm for a cable having $\rho_{min}$ of 120 mm.

In the embodiments shown with reference to FIGS. 1a, 1b, 3, and 4, the longitudinal structural elements of the cable 1, 50, and 70 are in direct mechanical coupling with the strain-transferring filler 6, 51, and 76, i.e., there is mechanical congruence between the longitudinal structural elements and the strain-transferring filler, in a strained condition. The resulting cable construction enables an effective and quick transfer of the strain experienced by the longitudinal structural elements, such as the electric conductors or optical conductors, to the strain sensor 5. The fast reaction to strain variations allows the detection of dynamic tensile forces and/or bending forces, occurring for instance in abrupt changes of winding directions or load/unload movements of the mobile equipment.

It is to be understood that the electric cable according to the disclosed embodiments allows the detection of strain, also when originating from portions of the cable not in direct contact with the strain-transferring filler, such as the cable inner sheath or outer sheath.

Furthermore, the disclosed embodiments encompass an electric cable comprising a plurality of longitudinal structural elements and a strain sensor 5 embedded in strain-transferring filler, wherein at least one of the longitudinal structural elements is in direct mechanical coupling with the strain-transferring filler.

If a substantially constant tensile force and/or bending force is applied to one longitudinal structural element of the cable during a given time interval, said force determines a strain to all longitudinal structural elements integrated in the cable, dependent on the friction and elasticity of the in-between elements/layers, which are in mechanical coupling with the strained longitudinal structural element, e.g., to the elements that are in direct contact with the strained longitudinal structural element or a mechanical coupling occurs across a material, such as a polymeric sheath, that separated the other elements from the strained element. The larger is the contact area and the higher the friction between elements (depending also on the value of the tensile force), the shorter is the longitudinal length portion of the cable required to have a uniform strain between the longitudinal structural elements. The longitudinal length portion necessary to have strain distributed on the entire cable cross-section is of the order of five cable diameters, thus typically not more than 20-40 cm, for heavy-duty cables for mobile equipment. The strain value acting in different portions of the cross section depends on the elastic properties of the constituting materials.

In case of the application of a tensile force and/or a bending force variable with time, such as in dynamic strain measurements, to one longitudinal structural element of the electric cable, the cable structure, taking into account the friction between elements, strong adherence between the layers, and thus a suitable selection of the materials composing the layers, becomes important.

Electric and optical cables according to the present disclosure can be monitored to determine the strain distributed along the cable by using Brillouin backscattering techniques, such as Brillouin optical time domain reflectometer (BOTDR), Brillouin optical time domain analysis (BOTDA), and Brillouin optical frequency domain reflectometer (BOFDR). Any monitoring systems, such as those disclosed in PCT International Publication WO 2010/136062 may be used to monitor the strain experienced by the cable using the strain sensor 5 disclosed herein.

It will be apparent to those skilled in the art that various modifications and variations can be made to the structure of the cable disclosed herein without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cable comprising a longitudinal structural element including at least one of an electrical conductor and an optical conductor, and a strain sensor arranged within a bending neutral region of the cable and mechanically coupled with the longitudinal structural element, wherein the strain sensor includes an optical fiber coated with at least one coating layer, a release layer surrounding the coating layer, and a protective layer surrounding the release layer; and wherein the release layer includes a material comprising an extruded polymer containing a slip agent, wherein the extruded polymer is selected from polyolefin, ethylene vinyl acetate copolymer, polyester copolymer, or polyvinylchloride, and the slip agent is selected from a silicone, a fluoropolymer, or a slip agent based on fatty acid amide.

2. The cable according to claim 1, wherein the release layer has a thickness less than or equal to 150 μm.

3. The cable according to claim 1, wherein the fatty acid amide is selected from oleamide or erucamide.

4. The cable according to claim 1, wherein the slip agent is a silicone selected from polydimethylsiloxane or functionalized polydimethylsiloxane.

5. The cable according to claim 1, wherein the fluoropolymer slip agent is selected from polytetrafluoroethylene or other aliphatic fluorinated polymers.

6. The cable according to claim 1, wherein the extruded polymer is a polyolefin, ethylene vinyl acetate copolymer, polyester copolymer or mixture thereof, with a flame-retardant filler.

7. The cable according to claim 1, wherein the polyester copolymer is a thermoplastic polyester elastomer.

8. The cable according to claim 1, wherein the slip agent is a combination of a silicone and a fluoropolymer.

* * * * *